US009631684B1

(12) United States Patent
Pope et al.

(10) Patent No.: US 9,631,684 B1
(45) Date of Patent: Apr. 25, 2017

(54) VELOCITY-DEPENDENT MECHANICAL AND MAGNETIC CLUTCH

(71) Applicant: The Board of Trustees of the Leland Stanford Junior University, Palo Alto, CA (US)

(72) Inventors: Morgan T. Pope, Palo Alto, CA (US); David L. Christensen, Palo Alto, CA (US); Elliot W. Hawkes, Palo Alto, CA (US)

(73) Assignee: The Board of Trustees of the Leland Stanford Junior University, Palto Alto, CA (US)

( * ) Notice: Subject to any disclaimer, the term of this patent is extended or adjusted under 35 U.S.C. 154(b) by 100 days.

(21) Appl. No.: 14/589,723

(22) Filed: Jan. 5, 2015

Related U.S. Application Data

(60) Provisional application No. 61/924,140, filed on Jan. 6, 2014.

(51) Int. Cl.
*F16D 27/01* (2006.01)
*F16D 43/00* (2006.01)
*F16D 11/04* (2006.01)

(52) U.S. Cl.
CPC .............. *F16D 27/01* (2013.01); *F16D 11/04* (2013.01); *F16D 43/00* (2013.01)

(58) Field of Classification Search
CPC ............. F16D 2121/18; F16D 2121/20; F16D 2500/10475; F16D 27/01; F16D 27/00; F16D 11/04; F16D 43/00; F16D 25/10475; H02K 7/10; H02K 7/1085; H02K 7/1125; H02K 7/125

USPC .......................................... 310/76, 78, 102 A
See application file for complete search history.

(56) References Cited

U.S. PATENT DOCUMENTS

| 3,426,303 | A | * | 2/1969 | Buckner | ............ H01H 36/0006 200/61.39 |
| 3,666,064 | A | * | 5/1972 | Bird | ........................ F16D 23/02 192/103 C |
| 2002/0072033 | A1 | * | 6/2002 | Bierbaum | ................ A61C 1/06 433/105 |

(Continued)

FOREIGN PATENT DOCUMENTS

| DE | 853307 C | * | 10/1952 | ............ H02K 7/125 |
| JP | 2003287960 A | * | 10/2003 | |

*Primary Examiner* — Colby M Hansen
*Assistant Examiner* — Lori Wu
(74) *Attorney, Agent, or Firm* — Womble Carlyle Sandridge & Rice LLP

(57) ABSTRACT

A mechanical and magnetic clutch is provided. The clutch includes a clutch device having a first magnet and a movable member having a plurality of magnets. The clutch device has a first position in which the clutch device and the movable member are disengaged and a second position in which the clutch device and the movable member are engaged. One of the plurality of magnets is arranged on the movable member to interact with the first magnet and move the clutch device from the first position to the second position, when the clutch device is moving at a first speed relative to the movable member. The plurality of magnets is arranged on the movable member to interact with the first magnet and keep the clutch device in the first position while the movable member is moving at a second speed relative to the clutch device.

20 Claims, 9 Drawing Sheets

(56) References Cited

U.S. PATENT DOCUMENTS

2003/0117935 A1* 6/2003 Utsumi ............... G11B 5/5582
720/702

* cited by examiner

VELOCITY-DEPENDENT MECHANICAL AND MAGNETIC CLUTCH

This application claims benefit of priority from U.S. Provisional Application No. 61/924,140 filed Jan. 6, 2014, which is hereby incorporated by reference for all purposes.

This invention was made with Government support under contract W911NF-08-2-0004 awarded by the Department of the Army and under contract HR0011-12-C-0040 awarded by the Defense Advanced Research Projects Agency. The Government has certain rights in the invention.

BACKGROUND

Mechanical clutches are many and varied, and generally connect and disconnect two mechanical components, such as rotating shafts, one driving and one driven. Clutches fall into two major categories, rotary and linear. Engaging the clutch connects the two mechanical components to rotate (or translate linearly) together. Disengaging the clutch disconnects the two mechanical components, so that that they are free to move independent to one another, or one may move while the other remains stationary. While the two mechanical components may have one degree of freedom, such as rotation about an axis or linear translation, various clutch devices may employ another degree of freedom, e.g., bringing one or more friction plates into contact with a receiving plate or plates. Centrifugal clutches are velocity dependent, and engage at higher rotational speeds of the driving shaft, and disengage at lower rotational speeds of the driving shaft. Torque limiting clutches slip when relative torque between the driving shaft and the driven shaft exceeds a preset amount. Slipper clutches engage positively for a forward rotation direction, but disengage upon experiencing a reverse torque of the driving shaft relative to the driven shaft. Fluid clutches transmit torque from a driving element (e.g., an impeller, in a torque converter) to a driven element (e.g., a turbine, in a torque converter) via a fluid. Lockup clutches lock two mechanical components together at higher velocities. It is within this context that present embodiments arise.

SUMMARY

In some embodiments, a mechanical and magnetic clutch is provided. The clutch includes a clutch device having a first magnet and a movable member having a plurality of magnets. The clutch device has a first position in which the clutch device and the movable member are disengaged and a second position in which the clutch device and the movable member are engaged. One of the plurality of magnets is arranged on the movable member so as to interact with the first magnet and move the clutch device from the first position to the second position, when the clutch device is moving at a first speed relative to the movable member. The plurality of magnets is arranged on the movable member so as to interact with the first magnet and keep the clutch device in the first position while the movable member is moving at a second speed relative to the clutch device.

In some embodiments, a velocity-dependent mechanical and magnetic clutch is provided. The clutch includes a clutch device having a first magnet and a rotatable member to which the clutch device engages and disengages. The clutch includes a second magnet arranged on the rotatable member so as to attract the first magnet and engage the clutch device and a plurality of further magnets arranged on the rotatable member so as to repel the first magnet. Rotating the clutch device and the rotatable member at a first rotational speed relative to each other causes the first magnet to pass over and be repelled by each of the plurality of further magnets and then be attracted and coupled to the second magnet whereupon the clutch device engages the rotatable member, wherein rotating the rotatable member and the clutch device at a second rotational speed relative to each other causes the first magnet to be repelled from the plurality of further magnets and pass over the second magnet with the clutch device remaining disengaged from the rotatable member. The first rotational speed is slower in absolute value than the second rotational speed.

In some embodiments, a method for operating a mechanical and magnetic clutch. The method includes rotating a clutch device relative to a rotatable member, at a first rotational speed. The clutch device having a first magnet and the rotatable member having a plurality of magnets, wherein the first magnet is repelled by and passes over a majority of the plurality of magnets, causing the clutch to remain disengaged from the rotatable member, and wherein the first magnet is attracted to one of the plurality of magnets and moves the clutch device to engage the rotatable member. The method includes disengaging the clutch device from the rotatable member and rotating the rotatable member relative to the clutch device at a second rotational speed that is faster in absolute value than the first rotational speed. The first magnet is repelled by the plurality of magnets causing the clutch to remain disengaged from the rotatable member.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A velocity-dependent, mechanical and magnetic clutch engages at low rotational speeds, has a disengagement mechanism, and remains disengaged at high rotational speeds, of a clutch device relative to a rotatable member. Relative rotational speed is thus a parameter upon which engagement of the clutch is based. Magnets arranged in the clutch device and the rotatable member repel the clutch device, on average across the forces produced on the clutch device by the magnets on the rotatable member, at higher relative rotational speeds. A subset of the magnets attracts the clutch device to the rotatable member at a particular relative position of the clutch device and the rotatable member, at lower relative rotational speeds. The averaging effect of repulsive and attractive magnets is herein applied and can be tuned to create different behaviors at different speeds. Arrangements and numbers of the magnets, strengths of the magnets, mass and moment of rotational and/or pivoting inertia of the clutch device, directions of rotation, types of release devices, types of engagement devices and other parameters are available for scaling the embodiments, defining further embodiments, and tuning sensitivity of clutch engagement to the rotational speeds. Rotational embodiments and linear embodiments of the clutch are envisioned.

Figure 1:
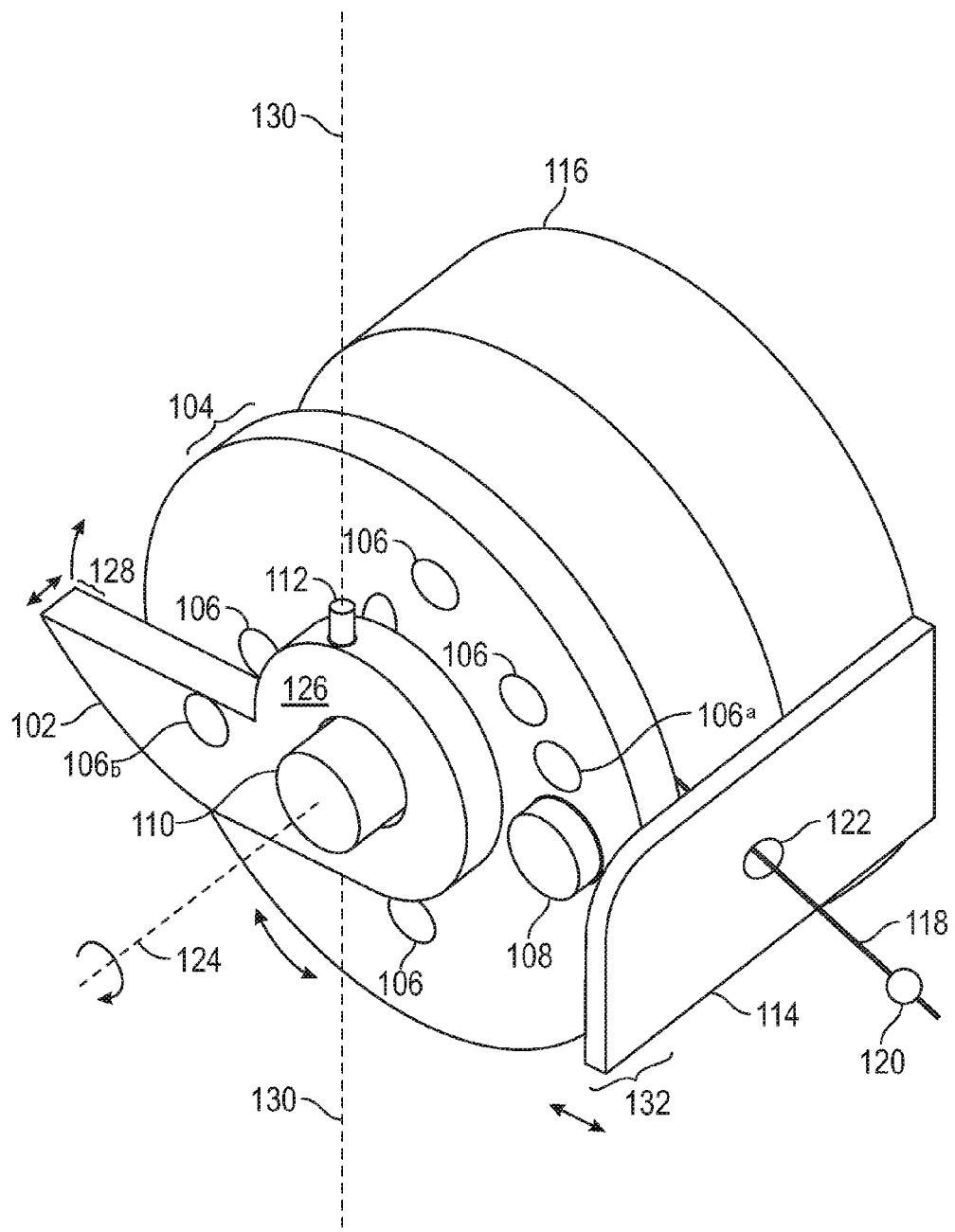
FIG. 1 is a perspective view of a velocity-dependent mechanical and magnetic clutch, in accordance with some embodiments.

FIG. 1 is a perspective view of a velocity-dependent mechanical and magnetic clutch, as an embodiment of the present disclosure. A motor 116 drives a shaft 110 to rotate in a clockwise direction (as indicated by the three quarters circle arrow) centered on a primary axis 124 (i.e., the longitudinal axis of the shaft 110). A rotatable member 104 is centered on the shaft 110 and free to rotate in a clockwise or counterclockwise direction relative to the shaft 110 (i.e., the rotatable member 104 is not pinned or splined to the shaft 110 or otherwise constrained to always rotate with the shaft 110 except by engagement of the clutch device 102). The clutch device 102 is pivotably attached to the shaft 110, for example by a pin 112 through a base region 126 of the clutch device 102, or other type of pivot device. The free end 128 of the clutch device 102 rotates with the shaft 110, and turns about the primary axis 124. Since the pin 112 allows pivoting of the clutch device 102 about a secondary axis 130 that is orthogonal to the primary axis 124 of rotation of the shaft 110, the free end 128 of the clutch device 102 can move closer to or further away from the rotatable member 104. This is indicated by the double headed arrow at the free end 128 of the clutch device 102.

Magnets 106 are embedded in and arranged in the rotatable member 104 and the clutch device 102. The magnets 106 play a key role in the behavior and operation of the clutch, as will be demonstrated below with reference to FIGS. 5-12. As is well-known, like poles of magnets (e.g. a north pole of one magnet and a north pole of another magnet, or a south pole of one magnet and a south pole of another magnet) repel, and opposite poles of magnets (e.g. a north pole of one magnet and a south pole of another magnet) attract.

Continuing with reference to FIG. 1, one magnet 106b is arranged on the clutch device 102 to attract to one magnet 106a arranged on the rotatable member 104 (note a downward facing north pole of a magnet 106b on the clutch device 102 and an upward facing south pole of a magnet 106a on the rotatable member 104) when these two magnets 106 align in proximity. This happens as the magnet 106b in the clutch device 102 passes near or over this particular magnet 106a on the rotatable member 104. Here, "upward" and "downward" are used as terms relative to a horizontal plane of the base of the motor 116 or of the rotatable member 104, and are independent of gravity. Further magnets 106 are arranged on the rotatable member 104 to repel the one magnet 106b arranged on the clutch device 102 (note the upward facing north poles of the remaining magnets 106 arranged on the rotatable member 104). In this embodiment, a mechanical stop 108, for example in the form of a post, is positioned on the rotatable member 104 adjacent to the magnet 106a of the rotatable member 104 that is arranged to attract the magnet 106b of the clutch device 102. Further embodiments use other types of mechanical stops and other types of engagement mechanisms such as friction surfaces, a pin on the clutch device 102 and an aperture or recess on the rotatable member 104 or vice versa, teeth, etc. One embodiment omits the mechanical stop 108 and relies on holding power of the magnets 106a and 106b, however sheer forces supported by this arrangement are not as great as with a mechanical stop 108 or other engagement mechanism. It should be appreciated that the orientations of the magnets could be reversed (i.e., swapping north for south), and that further arrangements of magnets are readily devised in accordance with the teachings herein.

Disengagement or release of the clutch device 102 from engagement with the rotatable member 104 is provided by a release wedge 114. A free end 132 of the release wedge 114 can move closer to or further away from the rotatable member 104, as indicated by a double headed arrow at the free end 132 of the release wedge 114. For example, the release wedge 114 can pivot at a base or elsewhere along the release wedge 114, in some embodiments. In some embodiments, the release wedge 114 is anchored at the base, for example to the base of the motor 116 or to a structure supporting the motor 116, and the release wedge 114 flexes. The release wedge 114 could be spring-loaded or hinged, etc. An aperture 122 in the release wedge 114 allows passage of a string 118 or other line such as a single or multifilament line or cable, chain, or other tension device. The string 118 has a release knot 120, such as a knot in the string 118, a bead attached to the string 118, or other device that prevents the line from further passing through the aperture 122 in the release wedge, such as a line stop.

Various embodiments of the clutch allow different behaviors of a clutch (i.e. locked or unlocked) based on the concept of dynamic magnetic averaging. While the clutch device 102 is rotating relative to the rotatable member 104, the majority of the magnets 106 of the rotatable member 104 repel the clutch device 102 and a single magnet 106a of the rotatable member 104 attracts the clutch device 102 towards the mechanical stop 108. At low angular velocities, the clutch device 102 is pulled into the mechanical stop 108, but at high angular velocities, the averaging effect of the magnets 106 is repulsive, allowing the clutch device 102 to spin freely relative to the rotatable member 104. Some embodiments, such as the one shown in FIG. 1, make use of velocity-dependent magnetic averaging for a one-way clutch. A further embodiment is applied to a linear clutch, as described below with reference to FIG. 13. One embodiment of a rotational clutch is applied to winding a spring for repeated jumps of an autonomous robot, as described below with reference to FIG. 14. In that embodiment, and in some other related embodiments, a design applies a single motor 116 turning a shaft 110 constantly to create a cyclically repeated winding and releasing or other repeated rotational cycling, with no further control or electronics needed (e.g., in embodiments with no electronic controller, no processor). This makes the device lightweight and small (i.e., compact) in some embodiments. However, this device could be used in further applications where repeated wind and release or other cycling is desired, at various scales. A controller could be applied, in further embodiments, for example to control motor speed and/or to control a release device, e.g., based on sensing or algorithmic control. In some embodiments, release of the clutch may be achieved by reversing the motor direction in some cases. For example, reversing the motor relatively quickly, i.e., faster than the spool plate can follow, results in the clutch lifting and the spool plate could begin to spin. Alternative variations of this embodiment are readily devised, especially when doing work to a load with a relatively large inertia.

Figure 2:
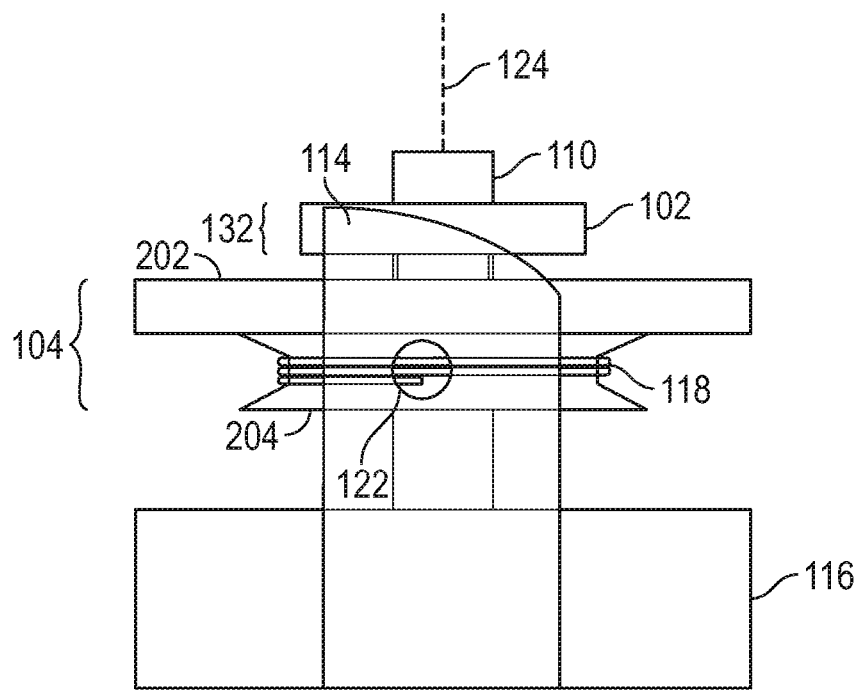
FIG. 2 is a side view of the clutch of FIG. 1, highlighting a release wedge in accordance with some embodiments.

FIG. 2 is a side view of the clutch of FIG. 1, highlighting a release wedge 114. The shaft 110 and primary axis 124 are oriented perpendicular to the base of the motor 116, in this embodiment, although many other types of motors and arrangements of a shaft 110 are possible. The clutch device 102 is pivotably attached to the shaft 110, and is shown in side view in relation to the rotatable member 104. In this embodiment, the rotatable member 104 has a spool 204 and a spool plate 202 attached to the spool 204. The string 118 is shown wound onto the spool 204, having passed through the aperture 122 of the release wedge 114.

When disengaging the clutch device 102, the release wedge 114 is positioned with the free end 132 of the release wedge 114 closer to the rotatable member 104 and the clutch device 102, so that the free end 128 of the clutch device 102 can ride up a ramp or wedge presented by the free end 132 of the release wedge 114. In the example shown in FIG. 2, the free end 128 of the clutch device 102 travels from right to left, as the shaft 110 rotates clockwise (when seen from above as in FIGS. 1 and 3). This motion of the clutch device 102 and positioning of the release wedge 114 causes the free end 128 of the clutch device 102 to rise up and away from the rotatable member 104 and disengage from the rotatable member 104. Particularly, the release wedge 114 is tall enough so that at the end of the wedge or ramp, the free end 128 of the clutch device 102 is sufficiently far from the spool plate 202 to disengage from the mechanical stop 108 (see FIGS. 1 and 3).

Figure 3:
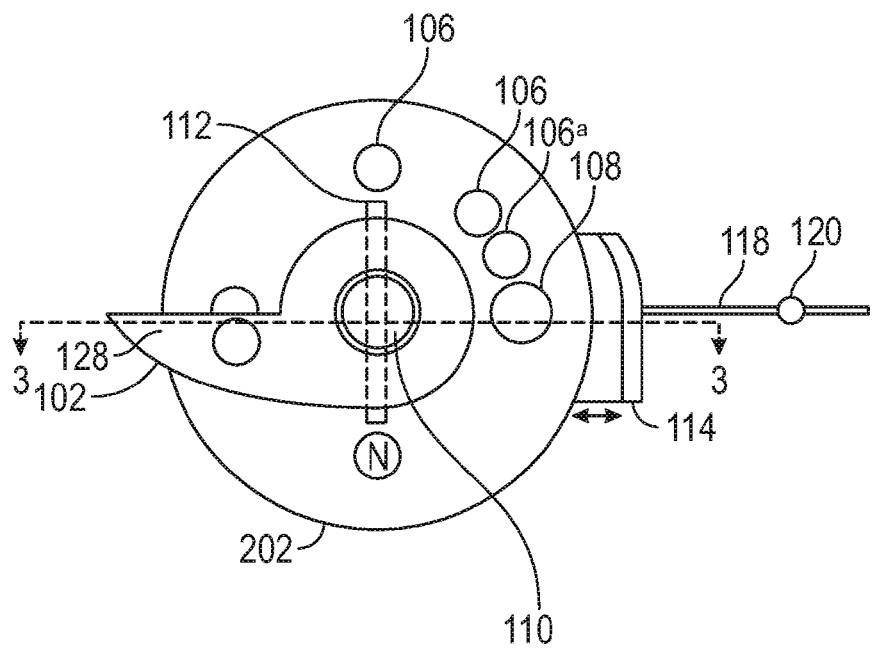
FIG. 3 is a top view of the clutch of FIG. 1, showing an example arrangement of magnets on a spool plate and a clutch device in accordance with some embodiments.

FIG. 3 is a top view of the clutch of FIG. 1, showing an example arrangement of magnets 106 on a spool plate 202 and a clutch device 102. As seen here, the magnet 106a that is intended to attract the clutch device 102 at low rotational speeds is arranged adjacent to the mechanical stop 108. Magnets 106 that are intended to repel the clutch device 102 are arranged at various locations around the rotatable member 104, more specifically on the spool plate 202 in this embodiment. Further arrangements are possible. As seen in this top view, the release wedge 114 can move closer to the spool plate 202, so as to interfere with the free end 128 of the clutch device 102 and disengage the clutch device 102. When not disengaging the clutch device 102, the release wedge 114 can move further from the spool plate 202, so as not to interfere with the free end 128 of the clutch device 102.

Figure 4:
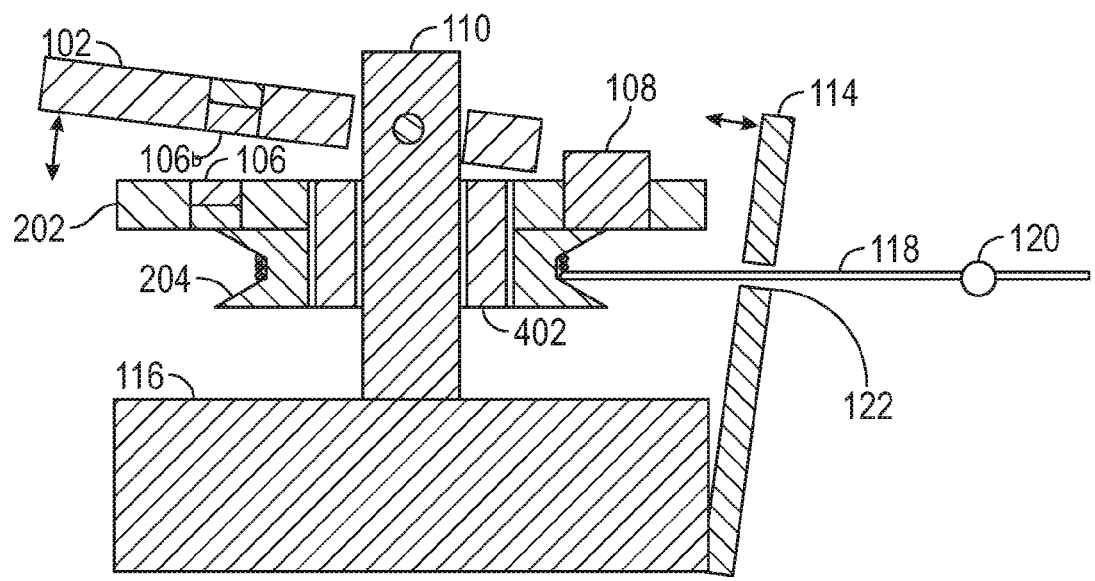
FIG. 4 is a cross-section view of the clutch of FIG. 1, showing ranges of motion and position for the clutch device and the release wedge, and relationship of a string or other line to a spool and to the release wedge in accordance with some embodiments.

FIG. 4 is a cross-section view of the clutch of FIG. 1, showing ranges of motion and position for the clutch device 102 and the release wedge 114, and relationship of a string 118 or other line to a spool 204 and to the release wedge 114. A bearing 402 rotatably couples the spool plate 202 and the spool 204 to the shaft 110 of the motor 116. Thus, the bearing 402 allows the spool plate 202 and the spool 204, which are mated to each other, to rotate relative to the shaft 110. Particularly, when the clutch device 102 is disengaged from the spool plate 202, the spool plates 202 and the spool 204 can spin freely on the motor shaft 110, and are not driven by the motor shaft 110 at that time. For example, sufficient tension on the string 118 with the clutch device 102 disengaged from the spool plate 202 causes the string 118 to unwind from the spool 204, turning the spool 204 and the spool plate 202 rapidly relative to the clutch device 102. Under such circumstances, the dynamic magnetic averaging results in the clutch device 102 remaining away from the spool plate and not engaging the mechanical stop 108.

When the clutch device 102 is engaged to the spool plate 202, and the clutch device 102 is pushing on the mechanical stop 108, the clutch device 102 and the spool plate 202 and the spool 204 rotate together, winding the string 118 onto the spool 204. This continues until the release knot 120, which cannot pass through the aperture 122 of the release wedge 114, pushes the release wedge 114 close enough to the clutch device 102 to disengage the clutch device 102. A complete cycle of operation of one embodiment of the clutch is described below, with reference to FIGS. 5-12.

Figure 5:
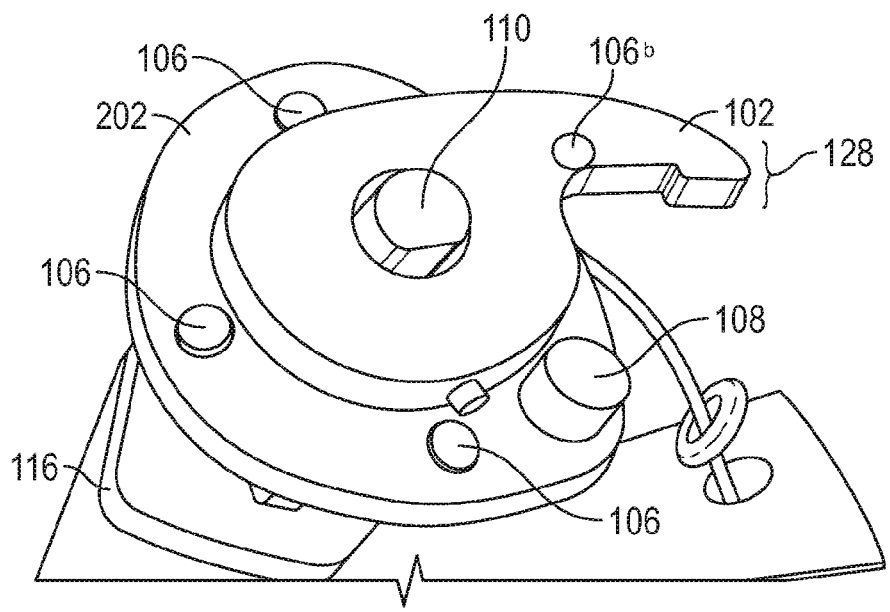
FIG. 5 is a view of the clutch of FIG. 1, with the clutch device rotating with the motor shaft, slowly in a clockwise direction in accordance with some embodiments.

FIG. 5 is a perspective view of the clutch of FIG. 1, with the clutch device 102 rotating with the motor shaft 110, slowly in a clockwise direction. The rotatable member 104 (see FIG. 1 for a complete view of the rotatable member), with mechanical stop 108 projecting upwards, is stationary with respect to the motor 116. Since the clutch device 102, with one of the magnets 106b, is being repelled by one of the magnets of the rotatable member 104 (embedded in the spool plate 202 in this embodiment), the clutch device 102 is pivoted about the secondary axis 130 so that the free end 128 of the clutch device 102 is away from the rotatable member 104.

Figure 6:
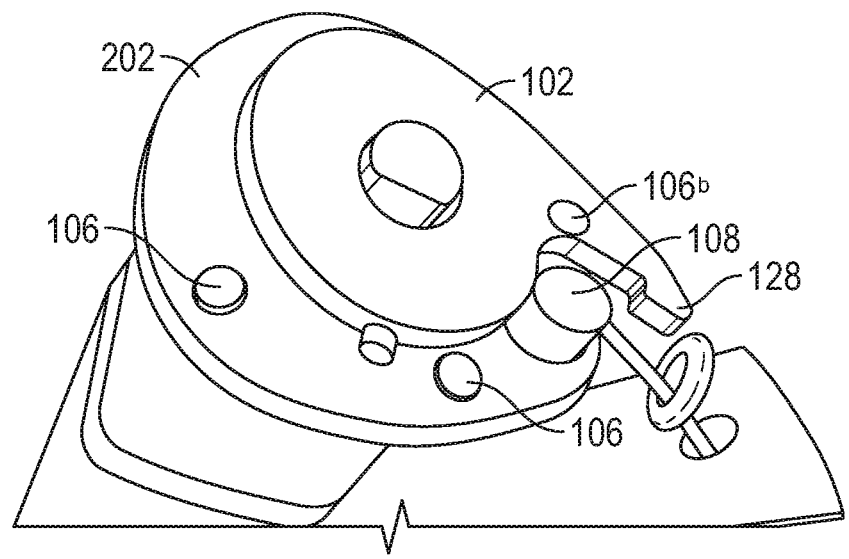
FIG. 6 is a view of the clutch of FIG. 1, with the clutch device pulled in by a magnet next to a mechanical stop on the spool plate in accordance with some embodiments.

FIG. 6 is a perspective view of the clutch of FIG. 1, with the clutch device 102 pulled in by a magnet 106a (not visible in FIG. 6, but see FIGS. 1 and 3) next to a mechanical stop 108 on the spool plate 202. The free end 128 of the clutch device 102 moves towards the spool plate 202, and engages the rotatable member 104 (see FIG. 1 for a complete view of the rotatable member) with the free end 128 of the clutch device 102 touching both the spool plate 202 and the mechanical stop 108.

Figure 7:
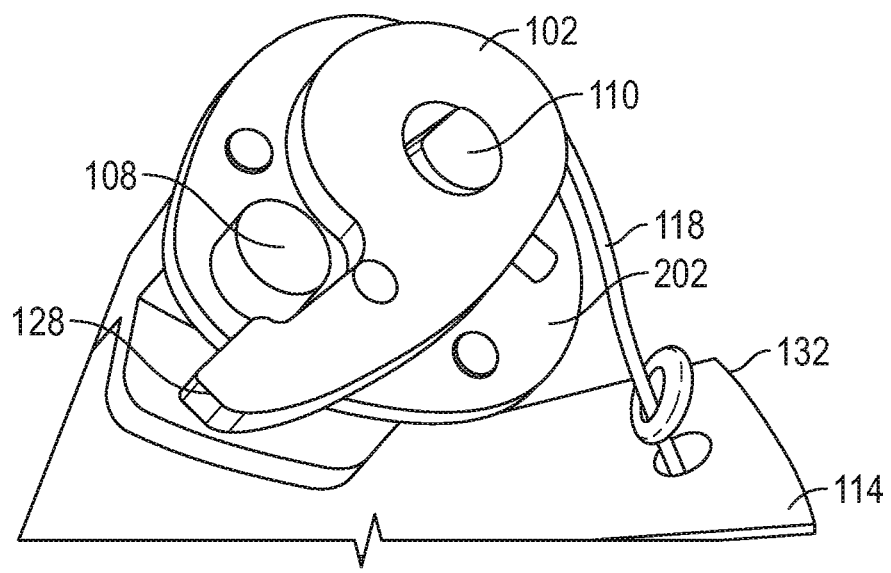
FIG. 7 is a view of the clutch of FIG. 1, with the clutch device engaged to the mechanical stop and the spool plate, and the clutch device rotating the spool plate in accordance with some embodiments.

FIG. 7 is a perspective view of the clutch of FIG. 1, with the clutch device 102 engaged to the mechanical stop 108 and the spool plate 202, and the clutch device 102 rotating the spool plate 202. The free end 128 of the clutch device 102 pushes the mechanical stop 108 in the clockwise direction, and the spool 204 (see FIG. 2) attached to and beneath the spool plate 202 can start winding up the string 118. Since the free end 132 of the release wedge 114 is away from the spool plate 202 and the clutch device 102, the clutch device 102 can remain engaged with the spool plate 202 for as few or as many revolutions of the shaft 110 (in the clockwise direction) as needed to wind up the string 118 onto the spool 204. When this has occurred (i.e., the task of winding has completed), and the release knot 120 (see FIG. 1) pushes the free end 132 of the release wedge 114 closer to the spool plate 202 and the clutch device 102, the release wedge 114 can disengage the clutch device 102 from the spool plate 202.

Figure 8:
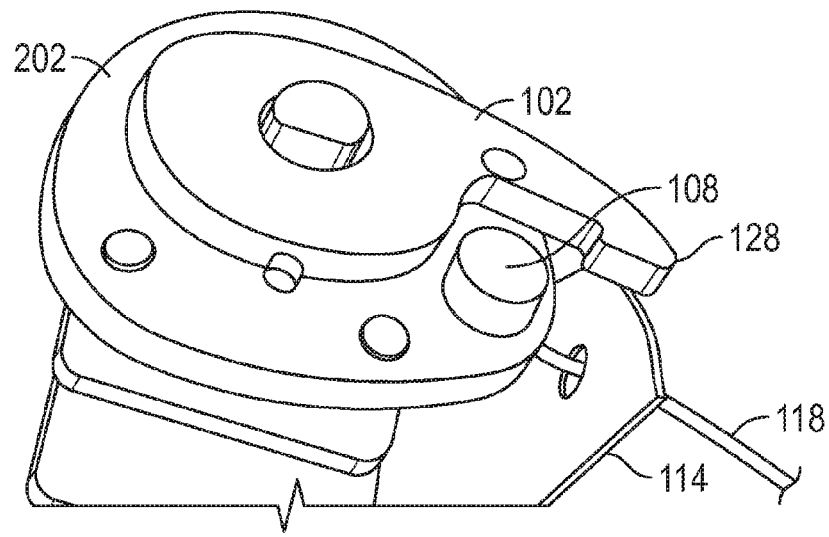
FIG. 8 is a view of the clutch of FIG. 1, with the release wedge moved towards the spool and the clutch device riding in a clockwise direction up the release wedge and lifting off from the spool plate, to disengage from the mechanical stop in accordance with some embodiments.

FIG. 8 is a perspective view of the clutch of FIG. 1, with the release wedge 114 moved towards the spool 204 and the clutch device 102 riding in a clockwise direction up the release wedge 114 and lifting off from the spool plate 202, to disengage from the mechanical stop 108. Once the free end 128 of the clutch device 102 clears the mechanical stop 108, the rotatable member 104 (see FIG. 1) is free to spin rapidly in the counterclockwise direction to allow the string 118 to unwind, under tension, from the spool 204. Tension can be supplied by a spring, as will be described in an embodiment with reference to FIG. 14 below.

Figure 9:
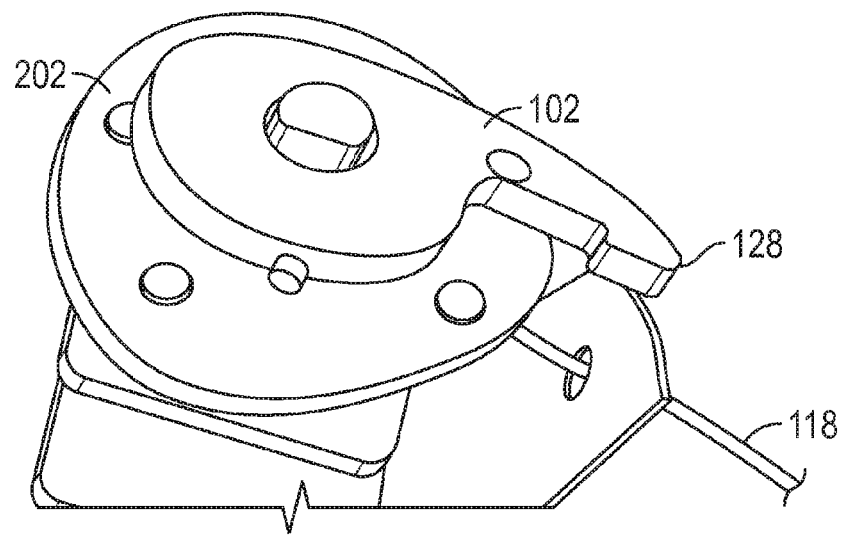
FIG. 9 is a view of the clutch of FIG. 1, with the clutch device lifted completely off and disengaged from the mechanical stop, and the spool plate free to spin quickly in a counterclockwise direction in accordance with some embodiments.

FIG. 9 is a perspective view of the clutch of FIG. 1, with the clutch device 102 lifted completely off and disengaged from the mechanical stop 108, and the spool plate 202 free to spin quickly in a counterclockwise direction. Sufficient tension should be maintained on the string 118 to keep the rotatable member 104 (see FIG. 1) rotating rapidly enough in the counterclockwise direction so that the dynamic magnetic averaging effect keeps the free end 128 of the clutch device 102 from contacting the mechanical stop 108 (hidden underneath the clutch device in this view).

Figure 10:
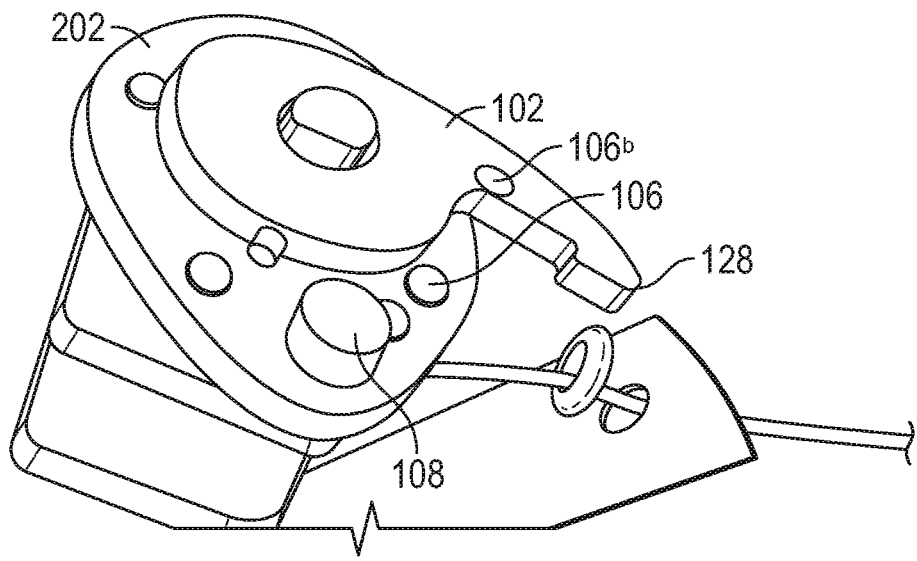
FIG. 10 is a view of the clutch of FIG. 1, with the spool plate spinning quickly in a counterclockwise direction, and a magnet in the clutch device repelled from magnets on the spool plate in accordance with some embodiments.

FIG. 10 is a perspective view of the clutch of FIG. 1, with the spool plate 202 spinning in a counterclockwise direction, and a magnet 106b in the clutch device 102 repelled from magnets 106 on the spool plate 202. Even though the magnet 106a (not labeled in FIG. 10, but see FIGS. 1 and 3) in the spool plate 202 which attracts the magnet 106b in the free end 128 of the clutch device 102 is approaching, the rapid rotation speed of the rotatable member 104 will allow the mechanical stop 108 to pass under the free end 128 of the clutch device 102 sooner than the free end 128 of the clutch device 102 could drop to engage the mechanical stop 108. Rotational moment of inertia of the clutch device 102 about the primary axis 124, pivoting (rotational) moment of inertia of the clutch device 102 about the secondary axis 130, and the forces produced by the magnets 106 are factors in determining the rotational speed above which the clutch device 102 remains disengaged.

Figure 11:
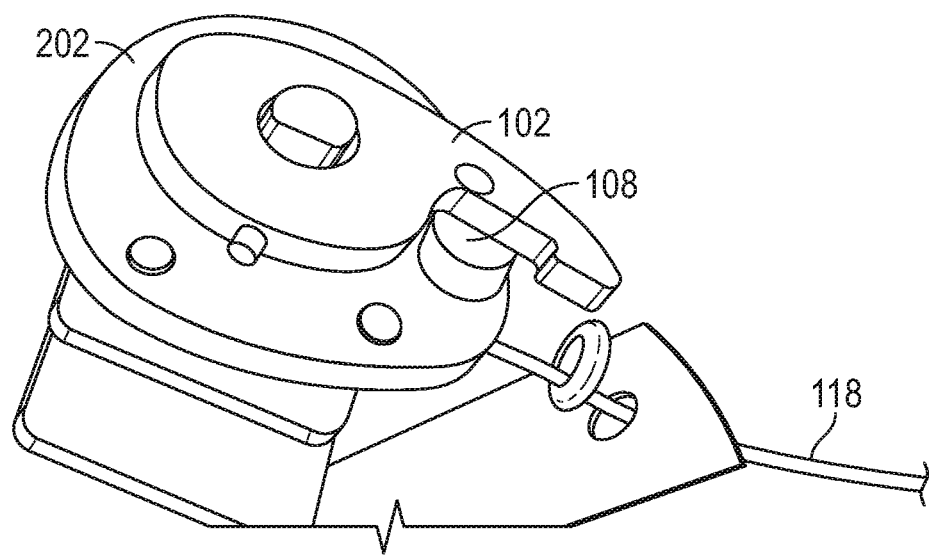
FIG. 11 is a view of the clutch of FIG. 1, with the spool plate continuing to spin quickly in the counterclockwise direction and the clutch device passing over the mechanical stop of the spool plate in accordance with some embodiments.

FIG. 11 is a perspective view of the clutch of FIG. 1, with the spool plate 202 continuing to spin quickly in the counterclockwise direction and the clutch device 102 passing over the mechanical stop 108 of the spool plate 202. So long as the rotatable member 104 spins above this critical rotational speed, the rotatable member 104 can turn as many revolutions as needed to unwind the string 118.

Figure 12:
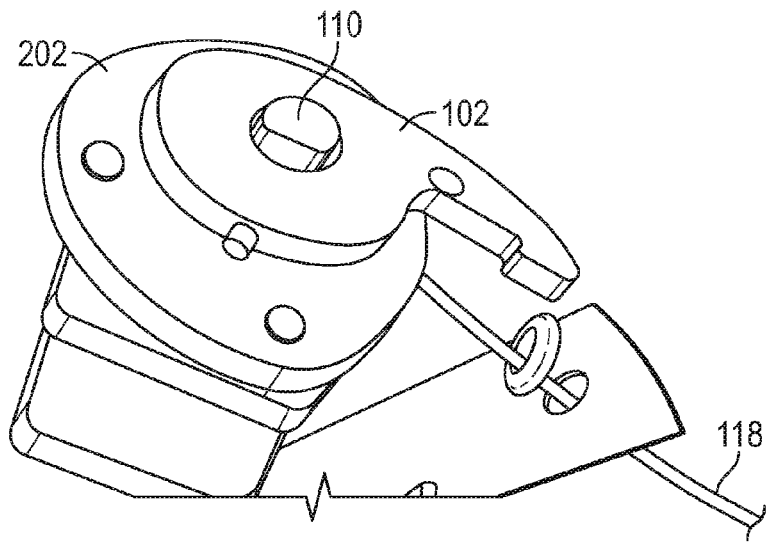
FIG. 12 is a view of the clutch of FIG. 1, with the spool plate continuing to spin quickly in the counterclockwise direction and the clutch device tilted away from engagement with the mechanical stop and the spool plate in accordance with some embodiments.

FIG. 12 is a perspective view of the clutch of FIG. 1, with the spool plate 202 continuing to spin quickly in the counterclockwise direction and the clutch device 102 tilted away from engagement with the mechanical stop 108 and the spool plate 202. When the string 118 is fully extended from the spool 204 (see FIG. 2), the spool 204 and attached spool plate 202 stop spinning. Then, since the motor shaft 110 with pinned clutch device 102 continues rotating in the clockwise direction, at a rate slower than the free spinning of the unspooling or unwinding phase of the spool 204, the clutch device 102 is ready to approach and reengage with the spool plate 202 and the mechanical stop 108 as shown in FIGS. 5 and 6.

With reference to FIGS. 5-12, one embodiment of the clutch cycles repeatedly through winding the string 118 and unwinding the string 118 in a cyclical manner. Engagement of the clutch is promoted by a slower relative rotation of the clutch device 102 relative to the rotatable member 104. The clutch is disengaged by completion of the task of winding the string 118, which completion activates the release wedge 114. A disengaged state of the clutch is maintained by a more rapid rotation of the rotatable member 104 relative to the clutch device 102, during the unwinding of the string 118. Engagement of the clutch is then invited by completion of the unwinding task, when the rapid rotation of the rotatable member 104 ceases, and the slower relative rotation of the clutch device 102 relative to the rotatable member 104 again promotes engagement of the clutch.

Further embodiments of the clutch, and application thereof to various mechanical systems, are readily devised. For example, instead of a string, the rotatable member could be coupled to another rotatable member or a linear member via gear teeth, a friction surface, further magnets, a belt, a shaft or other mechanical coupling. Instead of a string, the rotatable member could be employed to wind up a coil spring, which would provide tension on the rotatable member. This could be used as an auto winding mechanism for coil spring powered mechanical devices. Moreover, since it is relative movement of the clutch device 102 and the rotatable member 104, and the absolute values of the speeds thereof, rather than the direction or which component is moving more rapidly relative to the other, which makes use of dynamic magnetic averaging, further embodiments can vary the relationships among the components. For example, the rotatable member 104 could rotate at a steady speed or at various speeds while the clutch device is stationary, the clutch device could rotate at various speeds while the rotatable member is stationary or the rotatable member is rotating at various speeds, and so on.

Although embodiments have been described as independent of gravity and orientation relative to gravity, some embodiments especially with more massive components may be sensitive to gravity and orientation relative to gravity. In such cases, weight of a component and direction of the forces according to weight and inertia should be taken into account. Various components may be counterbalanced, in some embodiments.

Figure 13:
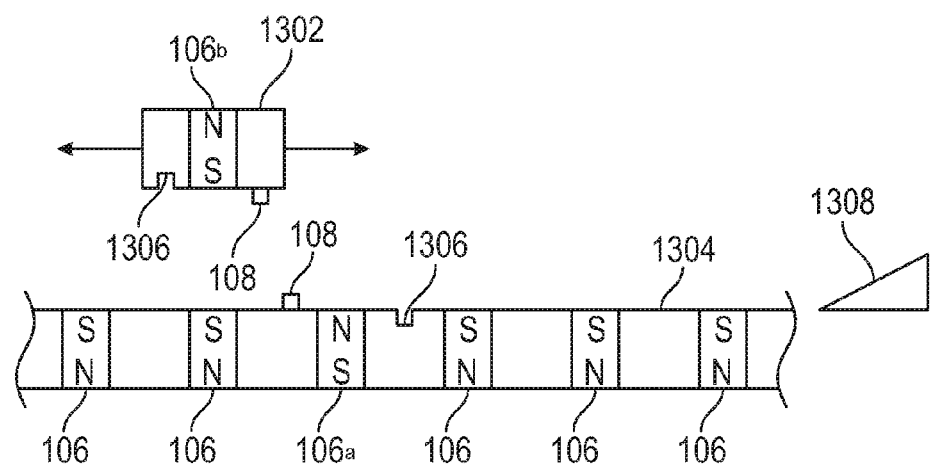
FIG. 13 is a schematic diagram of a velocity-dependent mechanical and magnetic linear clutch, based on some of the principles exhibited in the rotational clutch of FIG. 1 in accordance with some embodiments.
Figure 14:
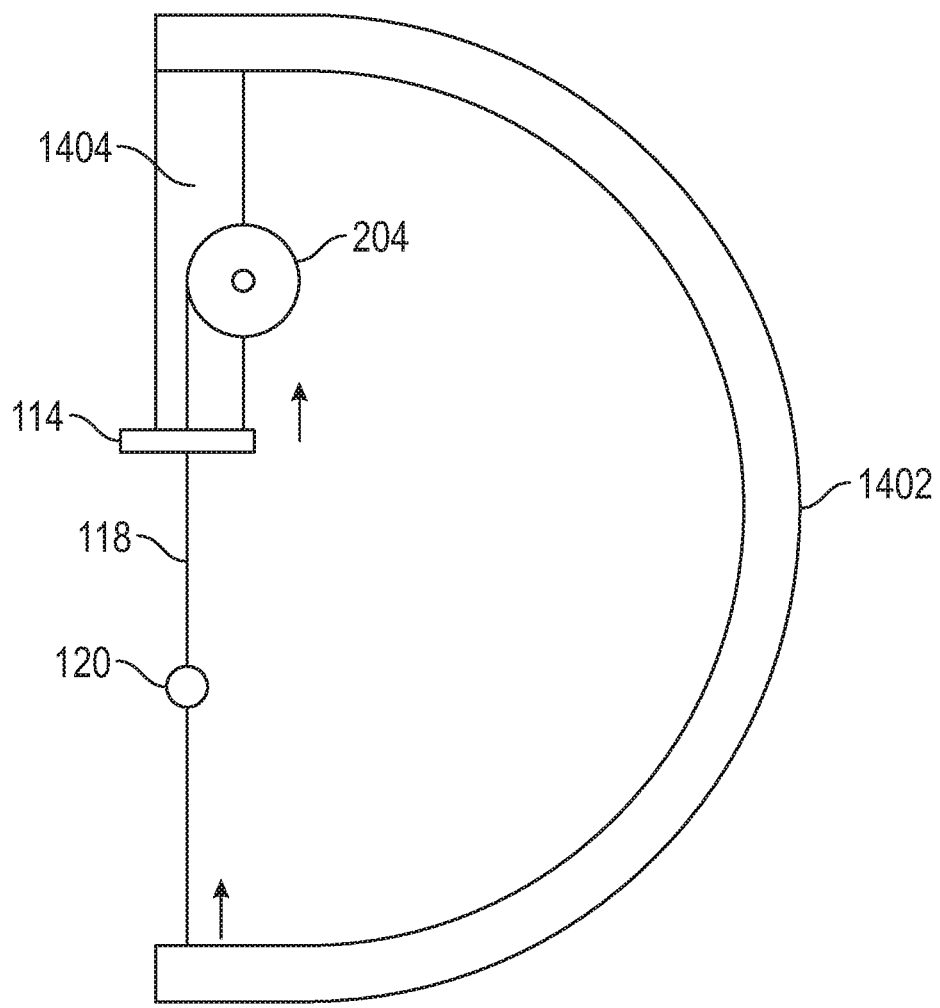
FIG. 14 is a side view of a clutched, cyclical motion system that employs the clutch of FIG. 1 and a curvilinear spring in accordance with some embodiments.

FIG. 13 is a perspective view of a velocity-dependent mechanical and magnetic linear clutch, based on some of the principles exhibited in the rotational clutch of FIG. 1. Here, a linear clutch device 1302 moves in parallel to a linear motion device 1304. A magnet 106b on the linear clutch device 1302 is repelled by a majority of the magnets 106 on the linear motion device 1304, and attracted by one of the magnets 106*a* on the linear motion device 1304. At relatively slower relative speeds between the two components, the linear clutch device 1302 can move close enough to the linear motion device 1304 so that a mechanical stop 108 of the linear clutch device 1302 engages a recess 1306 in the linear motion device 1304, and/or vice versa. The linear clutch device 1302 is then coupled to the linear motion device 1304, and the two components can then move together in a linear direction, at various speeds which can be slower or faster. At a desired location in the travel of the two components, a wedge 1306 could then separate the linear clutch device 1302 from the linear motion device 1304, disengaging the clutch. If the linear motion device 1304 is then moved more rapidly relative to the linear clutch device 1302 than was the case at the relatively slower relative speed when the two components were attracted and initially engaged, dynamic magnetic averaging could then prevent the two components from reengaging. Operation of the linear embodiment shown in FIG. 14 is thus related to operation of the rotational embodiments described above. Variations of the relationships of the components are also related to the variations discussed above regarding rotational embodiments. Attachments to either of the components, driving mechanisms, output mechanisms and so on are readily devised. Further operation of the release wedge 1306 or alternative release devices are readily devised in keeping with the teachings disclosed herein.

FIG. 14 is a side view of a clutched, cyclical motion system that employs the clutch of FIG. 1 and a curvilinear spring 1402. In one embodiment, the curvilinear spring 1402 is made of carbon fiber composite and provides a propulsion mechanism for a jumping and gliding (termed "jumpgliding") robot. An example bracket 1404 is shown in FIG. 14 as attaching a portion of the spring 1402, the release wedge 114 and the spool 204. Further brackets or other mounting devices, and some aspects of the clutch of FIG. 1 are omitted from FIG. 14 in order not to obscure aspects of the embodiment shown, and are readily devised in keeping with the teachings disclosed herein.

Autonomous robots are in an expanding field, where simplicity and weight is important. If robots are going to be able to operate on their own, simple solutions to challenging problems are needed. Some embodiments of the velocity-dependent mechanical and magnetic clutch described herein are suited for a repeated wind and release mechanism. For instance, an autonomous jumping robot can use the device to continually wind and release a spring for hopping. Some embodiments require neither control nor electronics to perform repeated wind and release actions, although this does not preclude application of electronics and/or other forms of control for further functions or to vary some of the functions. In further embodiments, a coil spring, a leaf spring or other type of spring could be used.

An autonomous loading and release mechanism is provided by an embodiment as depicted in FIGS. 1-12 and 14. To enable autonomous operation, the carbon spring 1402 must be loaded and freely released repeatedly. In the presented solution, a motor 116 winds a spool 204 with an engaged clutch to tension a string 118 that deflects the launch spring 1402. Once the launch spring 1402 is fully deflected, a release wedge 114 disengages the clutch, and the spool 204 freely unwinds. The embodiment shown has a release wedge 114 used as a trigger along with two other elements attached to a motor output shaft 110: a spool plate 202 which is passively free to rotate and a clutch device 102 which can pivot about a pin 112 that locks the clutch device 102 to the motor shaft 110, as illustrated in FIGS. 1-4. The spool plate 202 in this embodiment contains five NdFeB magnets 106 embedded into the face of the spool plate 202, and the clutch device 102 contains one magnet 106*b* along the same interface. The polarities of the magnets 106 are chosen such that one of the spool plate 202 magnets 106*a* attracts the clutch device 102 magnet 106*b* while the other four spool plate 202 magnets 106 repel it. A mechanical stop 108 is attached to the spool plate 202 near the attractive magnet 106*a*. When the angular velocity of the spool plate 202 is low with respect to the clutch device 102, the clutch device 102 is pulled toward the spool plate 202 by the attractive magnet 106*a* and caught by the mechanical stop 108. When the mechanical stop 108 catches the clutch device 102, a mechanical connection is formed between the spool plate 202 and the rotation of the motor shaft 110, allowing winding of the string 118. However, when the angular velocity of the spool 204 is high, the other four magnets 106 combine to create a net repulsive effect which prevents the clutch from engaging.

During operation, the motor 116 turns the shaft 110 slowly, the clutch engages, and the string 118 winds on the spool 204 to tension the spring 1402. When the spring 1402 reaches a set deflection, a release knot 120 translates the release wedge 114 into a position which disengages the clutch on its following pass. The spool 204 then unwinds rapidly on its ball bearings 402, during which time the clutch device 102 is repelled by the average magnetic force. When the spool 204 comes to rest at the end of the spring 1402 extension, the cycle repeats.

Advantages of this design include its low weight, the low control overhead necessary for its operation, and the minimal resistance created during spring extension. The motor chosen for one embodiment weighs 11 grams, and the mechanism adds 2 grams.

Figure 15:
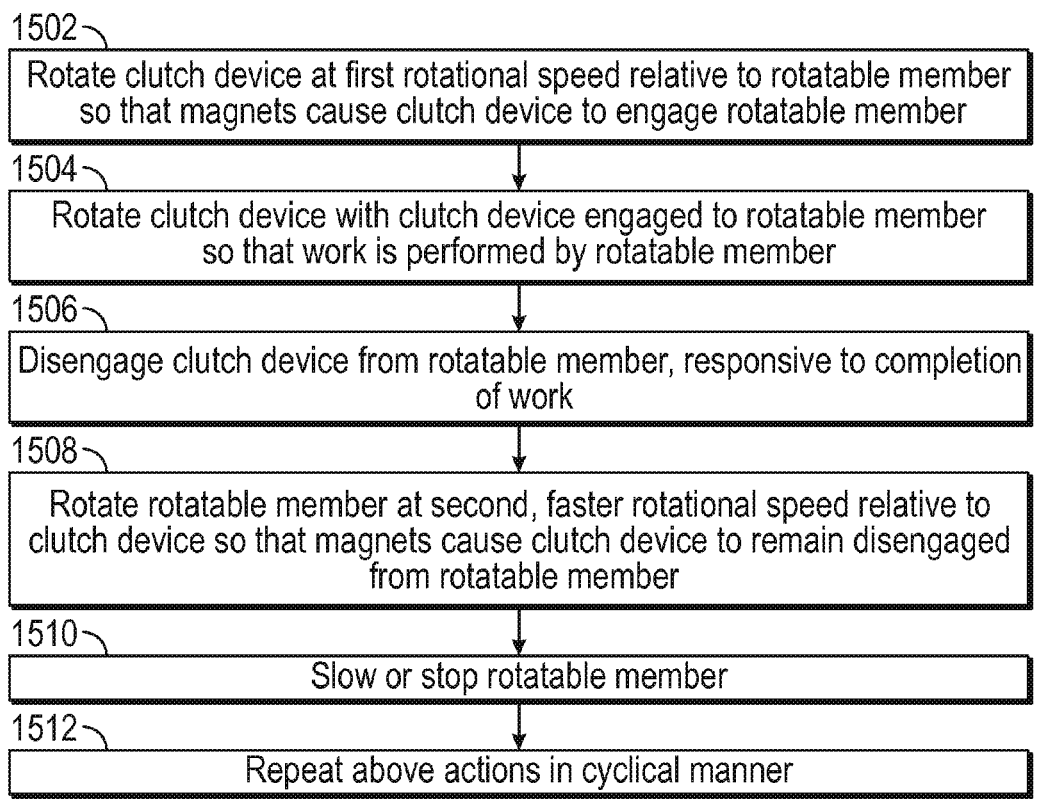
FIG. 15 is a method of operating a mechanical and magnetic clutch, which can be practiced on or by the clutch of FIG. 1, or variations thereof in accordance with some embodiments.

FIG. 15 is a method of operating a mechanical and magnetic clutch, which can be practiced on or by the clutch of FIG. 1, or variations thereof. In one embodiment, the method is applied to operating a mechanical and magnetic clutch to wind a string, tension a spring, and release the spring, in a repeated cyclical manner, for locomotion of a jumping or "jumpgliding" robot.

In an action 1502, a clutch device is rotated at a first rotational speed relative to a rotatable member, so that magnets cause the clutch device to engage the rotatable member. For example, an arrangement of magnets on a rotatable member and a clutch device as depicted in FIGS. 1-4, or a variation thereof can be used. A range of relative rotational speeds can be devised according to the teachings herein.

In an action 1504, the clutch device is rotated with the clutch device engaged to the rotatable member, so that work is performed by the rotatable member. For example, the rotatable member could wind up a line under tension, or transfer motion and force to another member via a coupling mechanism.

In an action 1506, the clutch device is disengaged from the rotatable member, responsive to completion of the work. For example, in the embodiments shown above, the release knot on the string moves the release wedge, which disengages the clutch from the spool plate upon completion of the winding up of the string. In a further embodiment, the string tensions a spring, so that the completion of the tensioning of the spring results in the clutch device being disengaged from the rotatable member.

In an action 1508, the rotatable member is rotated at a second, faster rotational speed relative to the clutch device, so that the magnets cause the clutch device to remain disengaged from the rotatable member. This employs the dynamic magnetic averaging concept discussed herein and depicted in FIGS. 9-12.

In an action 1510, the rotatable member is slowed or stopped. For example, when the string finishes unwinding from the spool 204, the spool 204 stops. In an embodiment with a spring, the spring is fully extended at such time.

In an action 1512, the above actions are repeated in a cyclical manner. The clutch device, rotating at the first rotational speed, reengages the rotatable member, a second round of work is performed by the rotatable member, the clutch device is again disengaged, the rotatable member is again spun rapidly, and stopped, and the cycle can repeat again. Variations on the above method, using further embodiments and cyclical or non-cyclical motions and various types of work are readily devised.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A mechanical and magnetic clutch, comprising:
    a clutch device having a first magnet;
    a movable member having a plurality of magnets;
    the clutch device having a first position in which the clutch device and the movable member are disengaged and a second position in which the clutch device and the movable member are engaged and move together;
    one of the plurality of magnets arranged on the movable member so as to interact with the first magnet and move the clutch device from the first position to the second position, when the clutch device is moving at a first speed relative to the movable member; and
    the plurality of magnets arranged on the movable member so as on average to interact with the first magnet and keep the clutch device in the first position while the movable member is moving at a second speed relative to the clutch device.

2. The mechanical and magnetic clutch of claim 1, further comprising:
    a rotational shaft defining a first axis;
    the movable member free to rotate relative to the rotational shaft and the first axis;
    the clutch device attached by a pivot to the rotational shaft such that a free end of the clutch device moves closer to and farther from the movable member, the pivot constraining the clutch device to rotate with the rotational shaft;
    a mechanical stop attached to the movable member and positioned to engage the clutch device to the movable member when the free end of the clutch device is moved closer to the movable member with the free end of the clutch device proximate to the mechanical stop;

the first magnet attached to the free end of the clutch device;

the one of the plurality of magnets attached to the movable member in a vicinity of the mechanical stop, the one of the plurality of magnets attractive to the first magnet such that the one of the plurality of magnets can attract the first magnet to engage the clutch device to the movable member at the mechanical stop; and the plurality of magnets including at least one further magnet attached to the movable member, the at least one further magnet repulsive to the first magnet.

3. The mechanical and magnetic clutch of claim 1, further comprising:

a release device having a third position that provides clearance between the release device and the clutch device, and a fourth position that provides interference to the clutch device resulting in a free end of the clutch device disengaging from the movable member and moving farther from the movable member.

4. The mechanical and magnetic clutch of claim 1, further comprising:

a release device having a ramp or a wedge that a free end of the clutch device rides up as the clutch device moves engaged with the movable member when the release device is in a fourth position, to disengage the free end of the clutch device from a mechanical stop of the movable member, wherein a third position of the release device has the ramp or the wedge maintained separate from the free end of the clutch device.

5. The mechanical and magnetic clutch of claim 1, further comprising:

the movable member having a spool and a spool plate, with the plurality of magnets attached to the spool plate and wherein the second speed is faster in absolute value than the first speed.

6. The mechanical and magnetic clutch of claim 1, further comprising:

a curvilinear spring, wherein the movable member and the clutch device are configured to tension the curvilinear spring and release the curvilinear spring, in a cyclical manner.

7. The mechanical and magnetic clutch of claim 1, further comprising:

a release device configured to disengage the clutch device from the movable member;

the clutch device is a linear clutch device; and the movable member is constrained to move in a linear motion.

8. The mechanical and magnetic clutch of claim 1, further comprising:

a release device having a third position that supports the clutch device engaging the movable member and a fourth position that disengages the clutch device from the movable member; and a line arranged to interact with the movable member and the release device, wherein the movable member winds up the line with a portion of the line passing through a portion of the release device, until a further portion of the line triggers the release device to move from the third position to the fourth position, wherein the movable member and the clutch device are configured to wind up the line onto the movable member at a first rotational speed, and unwind the line from the movable member at a second rotational speed that is faster in absolute value than the first rotational speed.

9. A velocity-dependent mechanical and magnetic clutch, comprising:

a clutch device having a first magnet;

a rotatable member to which the clutch device engages and disengages;

a second magnet arranged on the rotatable member so as to attract the first magnet and engage the clutch device; and a plurality of further magnets arranged on the rotatable member so as to repel the first magnet, wherein rotating the clutch device and the rotatable member at a first rotational speed relative to each other causes the first magnet to pass over and be repelled by each of the plurality of further magnets and then be attracted and coupled to the second magnet whereupon the clutch device engages the rotatable member and the clutch device and the rotatable member rotate together, wherein rotating the rotatable member and the clutch device at a second rotational speed relative to each other causes the first magnet to be repelled from the plurality of further magnets and pass over the second magnet with the clutch device remaining disengaged from the rotatable member, and wherein the first rotational speed is slower in absolute value than the second rotational speed.

10. The velocity-dependent mechanical and magnetic clutch of claim 9, further comprising:

a rotational shaft;

the rotatable member positioned on the rotational shaft and rotatable independent of the rotational shaft, the rotatable member having a mechanical stop to which the clutch device engages and disengages;

the clutch device having a first portion attached to the rotational shaft in a pivotable manner, and a second portion having the first magnet attached thereto;

a release device having a first position and a second position; and the clutch device, the rotatable member and the release device configured so that the clutch device rotates with the rotational shaft, the second portion of the clutch device is attracted towards the rotatable member via the first magnet and the second magnet, the second portion of the clutch device moves towards the rotatable member and engages the mechanical stop, the clutch device presses on the mechanical stop so that the clutch device and the rotatable member rotate with the rotational shaft, the release device moves from the first position to the second position and the second portion of the clutch device engages the release device so that the second portion of the clutch moves away from the rotatable member and disengages from the mechanical stop.

11. The velocity-dependent mechanical and magnetic clutch of claim 9, further comprising:

the clutch device including an arm having a first portion with the first magnet attached thereto, and a second portion having a pivot.

12. The velocity-dependent mechanical and magnetic clutch of claim 9, further comprising the rotatable member having a post as a mechanical stop to which the clutch device engages and disengages.

13. The velocity-dependent mechanical and magnetic clutch of claim 9, further comprising:

a release device having a first position, and a second position which disengages the clutch device from the rotatable member;

the rotatable member including a spool and a spool plate;

the spool configured to wind up a line while the clutch device and the rotatable member rotate engaged together;

the release device configured so that a portion of the line moves the release device from the first position to the second position; and the spool configured to unwind the line, with the rotatable member rotating free of the clutch device, after the release device disengages the clutch device from the rotatable member.

14. The velocity-dependent mechanical and magnetic clutch of claim 9, further comprising:

a line;

a spring;

a release device; and the clutch device, the rotatable member and the release device configured so that the rotatable member winds up the line so as to tension the spring while the clutch device and the rotatable member rotate with the clutch device engaged to the rotatable member, until a portion of the line moves the release device from a first position to a second position, which causes the clutch to disengage and release the rotatable member, and the rotatable member unwinds the line so as to release tension of the spring, the rotatable member winding up and unwinding the line in a repeatable, cyclical manner.

15. A method for operating a mechanical and magnetic clutch, comprising:

rotating a clutch device relative to a rotatable member, at a first rotational speed, the clutch device having a first magnet and the rotatable member having a plurality of magnets, wherein the first magnet is repelled by and passes over a majority of the plurality of magnets, causing the clutch to remain disengaged from the rotatable member, and wherein the first magnet is attracted to one of the plurality of magnets and moves the clutch device to engage the rotatable member so that the clutch device and the rotatable member rotate together;

disengaging the clutch device from the rotatable member; and rotating the rotatable member relative to the clutch device, at a second rotational speed that is faster in absolute value than the first rotational speed, wherein the first magnet is repelled by the plurality of magnets, causing the clutch to remain disengaged from the rotatable member.

16. The method of claim 15, further comprising:

performing a mechanical task via rotation of the rotatable member with the clutch device engaged to the rotatable member, wherein completion of the mechanical task triggers a release device that performs the disengaging the clutch device from the rotatable member, wherein rotating the rotatable member relative to the clutch device prepares for repeating the performing the mechanical task, and wherein the rotating the clutch device, the disengaging the clutch device, and the rotating the rotatable member are performed in a repeating, cyclical manner governed by the release device.

17. The method of claim 15, further comprising:

rotating the clutch device while the clutch device is engaged to the rotatable member, resulting in the rotatable member winding up a line;

triggering a release device with a portion of the line, resulting in the release device moving to disengage the clutch device from the rotatable member;

continuing to rotate the clutch device, while the rotatable member unwinds the line at the second rotational speed with the clutch device disengaged from the rotatable member; and continuing to rotate the clutch device, whereupon the rotatable member finishes unwinding the line and stops, the clutch device rotates at the first rotational speed relative to the rotatable member and the clutch device re-engages the rotatable member.

18. The method of claim 15, further comprising:

applying the rotatable member, via a tension device, to tension a curvilinear spring;

triggering a release device to disengage the clutch device from the rotatable member, via a position of the tension device;

applying disengagement of the clutch device from the rotatable member to release the tension on the tension device and the curvilinear spring; and re-engaging the clutch device to the rotatable member as a result of the clutch device rotating at the first rotational speed relative to the rotatable member after the tension on the tension device and the curvilinear spring is released, wherein the curvilinear spring is tensioned and released in a repeating and cyclical manner governed by the tension device and the release device.

19. The method of claim 15, further comprising:

disengaging the clutch device from the rotatable member via a release device having a ramp or wedge, wherein a free end of the clutch device travels along the ramp or wedge and moves away from and disengages from the rotatable member.

20. The method of claim 15, further comprising:

pivoting the clutch device so that a free end of the clutch device moves towards the rotatable member to engage the clutch to a mechanical stop of the rotatable member, responsive to the first magnet coupling to the one of the plurality of magnets.

* * * * *